(12) United States Patent
Tasaki et al.

(10) Patent No.: US 6,798,467 B2
(45) Date of Patent: Sep. 28, 2004

(54) LIQUID CRYSTAL DISPLAY DEVICE AND A METHOD FOR PRODUCING THE SAME

(75) Inventors: Masutsugu Tasaki, Shirakawa (JP); Akira Ichikawa, Shirakawa (JP)

(73) Assignee: Asahi Rubber Inc., Saitama (JP)

( * ) Notice: Subject to any disclaimer, the term of this patent is extended or adjusted under 35 U.S.C. 154(b) by 139 days.

(21) Appl. No.: 10/021,072

(22) Filed: Dec. 19, 2001

(65) Prior Publication Data

US 2002/0154254 A1 Oct. 24, 2002

(30) Foreign Application Priority Data

Dec. 21, 2000 (JP) ........................................ 2000-389444

(51) Int. Cl.$^7$ ............................................. G02F 1/1333
(52) U.S. Cl. ............................ 349/58; 122/84; 122/91
(58) Field of Search ........................... 349/58, 122, 84, 349/91

(56) References Cited

U.S. PATENT DOCUMENTS 3,894,183 A * 7/1975 Barish ..................... 178/18.05
4,025,688 A * 5/1977 Nagy et al. ................. 428/350
5,753,140 A * 5/1998 Shigemura ............. 252/299.01

* cited by examiner

Primary Examiner—Robert H. Kim
Assistant Examiner—George Y. Wang
(74) Attorney, Agent, or Firm—Bacon & Thomas, PLLC (57) ABSTRACT

The present invention is designed to provide a liquid crystal display device in which a nontacky silicone sheet having rubber elasticity is so provided between a liquid crystal display panel and a transparent protection plate for protecting the liquid crystal display panel as not to form any air layer and a method for producing such a liquid crystal display device.

16 Claims, 6 Drawing Sheets

LIQUID CRYSTAL DISPLAY DEVICE AND A METHOD FOR PRODUCING THE SAME

BACKGROUND OF THE INVENTION

1. Field of the Invention

The present invention relates to a liquid crystal display device mounted in a portable game device or a mobile phone or a liquid crystal display device used in a display of a personal computer and the like or a liquid crystal television screen and particularly to a liquid crystal display device having a good visibility and a good assembling operability.

2. Description of the Related Art

In a liquid crystal display device mounted in a portable game device or a mobile phone and a liquid crystal display device used in a display of a personal computer and the like or a liquid crystal television screen, the front surface of a liquid crystal display panel is normally covered by a transparent protection plate in order to protect the liquid crystal display panel. Normally, a clearance is defined between the liquid crystal display panel and the transparent protection plate. This is intended to prevent a reduction in display quality caused by local exertion of a pressure on the liquid crystal display panel from a pen at the time of hand-writing input using, for example, an input pen or the like or to protect the liquid crystal display panel from an external shock.

However, since such a clearance leads to formation of an air layer between the liquid crystal display panel and the transparent protection plate, reflection losses of light at these interfaces are large, thereby causing a problem of reduced visibility of the display panel. In order to prevent a reduction in visibility, an attempt has been made to eliminate the air layer by providing a transparent element in a space between the liquid crystal display panel and the transparent protection plate.

For example, Japanese Unexamined Patent Publication No. 6-337411 discloses a method according to which a liquid raw material of a light-confusion preventing member is injected between a liquid crystal display panel and a transparent protection plate and cured to form a shock-absorbing layer (silicone gel, polyurethane elastomer), and placing and adhering the liquid crystal display panel on and to the formed shock-absorbing layer in a reduced-pressure atmosphere.

However, since operations of pouring and curing the liquid raw material have to be carried out in individual apparatuses, productivity is poor. Thus, a technique of providing an already-cured plate-shaped sheet between the liquid crystal display panel and the transparent protection plate has been studied.

For example, Japanese Unexamined Patent Publication No. 6-75210 proposes a method according to which an adhesive sheet made of a transparent tacky resin (acrylic polymer, tacky silicone polymer containing an organopolysiloxane skeleton as a base) and having a shock-absorbing property is provided between a liquid crystal display panel and a transparent protection plate. In such a case, the panel, the plate and the sheet are adhered while being closely attached to each other with a volatile solvent provided on adhesive interfaces, thereby preventing air from getting trapped.

Further, Japanese Unexamined Patent Publication No. 9-133912 discloses a transparent nongelatinous resin (e.g. nongelatinous acrylic polymer) sheet having a shock-absorbing property and tackiness. Here, after a separator on one surface of a resin sheet is peeled off and this surface is adhered to a liquid crystal display panel (or transparent protection plate) by a roll laminator or the like, a separator on the other surface is peeled off and this surface is adhered to the transparent protection plate (or liquid crystal display panel) by a press-adhering method or the like. In the case that air bubbles are trapped at the adhesive interfaces, deaeration is applied using an autoclave or a vacuum deaerator.

Japanese Unexamined Patent Publication No. 9-197387 proposes provision of a transparent resin sheet made of a polymer containing a plasticizer and having a weak adhesiveness. This adhesive resin sheet is placed on the display panel or the transparent protection plate while preparing a volatile liquid to such a degree as not to swell or dissolve, and adhered thereto by a roll laminator or the like. Thereafter, the volatile liquid is supplied and the transparent protection plate or the display panel is placed and adhered by a press-adhering method or the like.

In any of the above methods, the tacky sheet is used and can be placed on the display panel by, e.g. pressing and can be adhered to the transparent protection plate using its tackiness. Thus, these methods have a better productivity than the method according to which the liquid is injected and cured. However, in order to eliminate air bubbles having entered between the interfaces of the sheet and the liquid crystal display panel or the transparent protection plate, the entered air is deaerated by applying the volatile liquid to the interfaces and using the volatility of the applied liquid or by using a reduced-pressure or vacuum deaerator. Such deaeration is, of course, problematic in respect of productivity.

On the other hand, Japanese Unexamined Patent Publication No. 9-6256 proposes a method according to which a transparent tacky sheet made of a polymer whose glass transition temperature is −30° C. or lower and having a shock-absorbing property (e.g. acrylic polymer, tacky silicone polymer having an organopolysiloxane skeleton) is provided between a liquid crystal display panel and a transparent protection plate. Such a transparent tacky sheet is excellent in respect of productivity since it can be adhered to the liquid crystal display panel and the transparent protection plate upon being lightly pressed due to its tackiness and it does not require any special deaeration such as application of a volatile liquid or a vacuum deaerator. Further, Japanese Unexamined Patent Publication No. 9-318932 discloses a laminated sheet in which an adhesive layer and a shock-absorbing layer are placed one over the other. This laminated sheet serves to maintain an adhered state and to prevent generation of air bubbles since the shock-absorbing layer thereof can prevent a distortion caused by a pressure given from a pen or the like and the tacky layer thereof can be easily adhered to the liquid crystal display panel or the transparent protection plate without trapping air bubbles at the interface.

However, since the tacky or adhesive sheet is used as a finished sheet in any of the methods using the above finished sheet, there is a problem that the tacky surfaces of the finished sheets are likely to be stained in the case that a liquid crystal display device is assembled while preparing a large number of finished sheets. If the tacky surface is stained, it leads to reduced tackiness. In addition, air enters due to dust or the like adhered to the tacky surface, with the result that reflection loss of light occurs at that portion, thereby reducing a visibility.

If dust or the like should be attached to the tacky surface, there is no means for removing the dust or the like from the tacky surface. Thus, the finished sheet has to be disposed of. On the other hand, at a production site, devices are often assembled using finished sheets having dust or the like attached thereto without noticing the adhesion of dust or the like. This causes a variation in the quality of final products and a poor yield.

SUMMARY OF THE INVENTION

An object of the present invention is to provide a liquid crystal display device having a high visibility and a good yield by eliminating trapping of an air layer or air by a simple operation.

An inventive liquid crystal display device comprises a liquid crystal display panel; a nontacky silicone sheet having rubber elasticity and placed on and adhered to the liquid crystal display panel; and a transparent protection plate placed on and adhered to the silicone sheet.

An inventive method for producing a liquid crystal display device comprises the steps of placing a nontacky silicone sheet having rubber elasticity on a liquid crystal display panel; and removing air present at interfaces of the liquid crystal display panel and the silicone sheet by placing the silicone sheet.

DETAILED DESCRIPTION OF THE PREFERRED EMBODIMENTS

Figure 1:
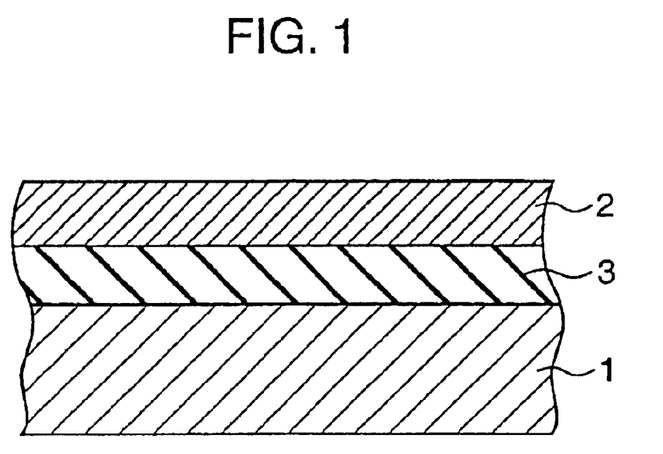
FIG. 1 is a section showing the construction of a liquid crystal display device according to the invention.

A liquid crystal display device according to the present invention is described with reference to FIG. 1.

This liquid crystal display device is provided with a liquid crystal display panel 1, a silicone sheet 3 placed on and adhered to the liquid crystal display panel 1, and a transparent protection plate 2 placed on and adhered to the silicone sheet 3.

First, the silicone sheet 3 used in the present invention is described.

The silicone sheet 3 used in the present invention is nontacky and has rubber elasticity.

Here, nontackiness means such a property that a force of tackiness or adhesion obtained in a loop tack test (JIS-Z0237), Polyken's probe tack test (JIS-Z0237) and 180° peeling test (JIS-C2107) which are tests generally used for the measurement of tackiness is almost 0 or an immeasurable level and preferably that a ball number measured in a ball tack test in accordance with JIS Z0237 is 2 or smaller.

Due to its nontackiness, it is difficult for dust or the like to attach to the outer surface of the rubber sheet 3. Even if dust is attached, the attached dust can be removed by a simple operation of adhering an adhesive tape such as a cellophane tape and then peeling it off, and the rubber sheet 3 can be reused. Thus, a yield can be increased and variation of products caused by attachment of dust during an operation can be suppressed by uniformly performing the above operation.

The silicone sheet 3 used in the present invention is made of an organosiloxane having a siloxane bonding as a skeleton, suitably three-dimensionally cross-linked and expressed by an average unit formula $R_a SiO_{(4-a)/2}$. In the formula, R denotes a substituted or nonsubstituted hydrocarbon group having a carbon atomic number of 1 to 10 selected from methyl groups, ethyl groups, propyl groups and butyl groups having a carbon atomic number of 1 to 10, preferably alkyl groups having a carbon atomic number of 1 to 8; vinyl groups, aryl groups and butenyl groups having a carbon atomic number of 1 to 10, preferably alkenyl groups having a carbon atomic number of 1 to 8; aryl groups such as phenyl groups and tolyl groups; halogen-substituted hydrocarbon groups such as chloromethyl groups in which part or all of hydrogen atoms bonded to carbon atoms of alkyl groups, alkenyl groups or aryl groups are substituted by halogen atoms, chloropropyl groups and 3,3,3-trifluoropropyl groups; cyano-substituted hydrocarbon groups such as 2-cyanoethyl groups in which part or all of hydrogen atoms bonded to carbon atoms of alkyl groups, alkenyl groups or aryl groups are substituted by cyano groups. In the formula, a is preferably 1.95 to 2.05.

A degree of crosslinking of the silicone sheet formed using the above organosiloxane can be changed by the kind and amount of a curing agent used with the polyorganosiloxane in addition to the content of a trifunctional silane monomer. As the curing agent can be used a peroxide, a metallic salt of a fatty acid, a metallic alcoholate, an amine compound, or a combination of an organohydrodienepolysiloxane and a platinum compound.

If the degree of crosslinking is too low due to the small content of the trifunctional silane monomer or the small content of the curing agent, the organosiloxane becomes an tacky silicone gel, whereby desired nontackiness cannot be obtained. In other words, if dust or the like is attached to the outer surface, it is substantially impossible to remove it and transparency is reduced. On the other hand, if the degree of crosslinking is too high, the silicone sheet 3 is like a silicone resin plate having substantially no rubber elasticity. It is difficult to adhere a sheet having substantially no rubber elasticity to the liquid crystal display panel 1 and the transparent protection plate 2 by pressing. Further, since it does not function as a shock-absorbing layer for absorbing a shock from outside, the liquid crystal display panel 1 cannot be protected from finger touching, pressure from a touch pen or an external shock. Hardness and tackiness can be changed by changing the kind of a filling agent and the amount of a plasticizer such as a silicone oil while maintaining the degree of crosslinking substantially at the same level. Further, nontackiness can be obtained by newly adding the curing agent only on the outer surface of the sheet to increase the degree of crosslinking. In short, it is sufficient for the silicone sheet used in the present invention to be nontacky and possess a desired rubber elasticity. There can be used a sheet molded of a silicone gel whose degree of crosslinking is increased to provide a desired rubber elasticity and nontackiness; a sheet provided with a desired shock-absorbing property by suitably controlling the amount of a plasticizer added to a silicone rubber; and a sheet obtained by applying or spraying a curing agent to the outer surface of a sheet-shaped silicone gel to cover the outer surface of the gel sheet by a nontacky layer having a higher degree of crosslinking than the gel.

In order to provide the silicone sheet used in the present invention with desired nontackiness and rubber elasticity, JIS-A hardness measured using a spring hardness meter is preferably 2 or larger, more preferably 11 or larger, and an upper limit thereof is preferably 70 or lower, more preferably 50 or lower. If hardness is below 2, the silicone sheet is tacky and, even if being molded into a sheet, it is inconvenient to handle because it is too soft. On the other hand, if hardness exceeds 70, the silicone sheet is too hard. Such a sheet causes a poor operability since it is difficult to suitably bend the silicone sheet during an assembling operation and the sheet poorly restores after being deformed. Further, a yield is likely to decrease because the sheet is easily damaged while being handled and scratch marks remain once being scratched.

In order to make the silicone sheet used in the present invention easier to handle during the assembling operation and to adhere it to the liquid crystal display panel and the transparent protection plate without clearances, Young' modulus is preferably $1 \times 10^6$ dyn/cm$^2$ or higher, more preferably $5 \times 10^6$ dyn/cm$^2$ or higher, and an upper limit thereof is preferably $8 \times 10^7$ dyn/cm$^2$, more preferably $6 \times 10^7$ dyn/cm$^2$ or lower. Further, a rate of change of length (residual elongation distortion rate) when a pulling force is eliminated after the opposite ends of a sheet piece having a length of 100 mm, a width of 5 mm and a thickness of 2 mm with respect to longitudinal direction are elongated by 150% at room temperature and left for 5 min. is preferably substantially 0%. Since there is an elongation distortion when Young's modulus is below $1 \times 10^6$ dyn/cm$^2$, restoration upon deformation is slow, causing a reduction in assembling operability. On the other hand, if Young's modulus exceeds $8 \times 10^7$ dyn/cm$^2$, it is difficult to bend the sheet and restoration upon deformation is slow, which also causes a reduction in assembling operability.

The outer surfaces of the silicone sheet used in the present invention need to be adhered to the liquid crystal display panel and the transparent protection plate without using an adhesive agent, a tackiness agent or the like. Thus, the surface roughness of the sheet, i.e. a parameter Ra (arithmetic average roughness) specified by JIS-B0601 has to be 12.5 $\mu$m or lower, preferably 5 $\mu$m or lower. In the case that the silicone sheet is a soft sheet having a JIS-A hardness of about 10 or lower, trapped air can be pushed out by pressing if surface roughness is up to about 12.5 $\mu$m. However, in the case of a silicone sheet having a JIS-A hardness of more than 10, surface roughness is preferably 5 $\mu$m or lower in order to secure a sufficient adhesion. On the other hand, if surface roughness exceeds 12.5, for example, in a state where tool marks remain on the outer surfaces of the sheet, air is likely to enter at the interfaces of the sheet and the liquid crystal display panel or the transparent protection plate and, even if the sheet is soft, it is difficult to remove the trapped air by, e.g. pressing, resulting in a poor adhesion.

Accordingly, the silicone sheet of the present invention may be molded using a mold finished with a mark "▽▽▽", preferably "▽▽▽▽" specified by JIS, the mold having its inner surfaces abraded by surface grinding, face mill grinding, precise filing, buffing, lapping, electrolytic polishing, or may be obtained by casting or coating a silicone composition, which will become a sheet material, onto a smooth resin film having a surface roughness (Ra) of 12.5 $\mu$m or lower, preferably 5 $\mu$m or lower and used as a base, heating and curing them in a heating oven and then peeling the base film off.

Due to its excellent adhesion, the silicone sheet 3 having the above properties can naturally remove air and air bubbles trapped at the interfaces only by being placed on the outer surface of the liquid crystal display panel 1. Even if there is air trapped at the interfaces when the silicone sheet is placed, the trapped air bubbles can be let out by peeling an end portion of the silicone sheet and placing it again or by pressing by hand. Further, even if dust or the like is attached to the outer surface while the sheet is being placed again, the stained surface may be cleaned by removing the dust or the like using an adhesive tape. Thus, an occurrence of a defect can be reduced. In the tacky sheet, once stain or dust is attached, it is adhered to a tack by chemical affinity. Thus, it is difficult to clean the stained surface. Further, if the silicone sheet is placed again by peeling off the end portion of the tacky sheet, it is an additional factor causing a defect since tackiness agent is already attached to the liquid crystal display panel or the transparent protection plate.

The shape of the silicone sheet 3 used in the present invention is not particularly restricted. For the purpose of covering the outer surface of the liquid crystal display panel 1 of the product, a shape in conformity with that of the liquid crystal display panel 1 is selected. Further, the silicone sheet 3 has such a size as to cover the liquid crystal display panel 1 and a thickness equal to a spacing between the liquid crystal display panel 1 and the transparent protection plate 2. By equaling the thickness of the sheet 3 to the spacing between the liquid crystal display panel 1 and the transparent protection plate 2, the sheet 3 can be, coupled by the effect resulting from its rubber elasticity, adhered to the liquid crystal display panel 1 or the transparent protection plate 2 so that air bubbles and the like do not enter. Once being adhered, the sheet 3 can prevent the entrance of air or the like into the interfaces.

A liquid crystal display panel and a transparent protection plate conventionally used in the filed of liquid crystal display devices can be used as the liquid crystal display panel 1 and the transparent protection plate 2 of the present invention.

In addition to a highly transparent resin plate such as an acrylic plate or a polycarbonate plate, a touch panel, a tablet plate or like transparent protection plate provided with a touch sensor in which a transparent electrode is held between two transparent resin plates can be used as the transparent protection plate.

It is preferable to form an antireflection layer on the surface of the transparent protection plate not in contact with the silicone sheet. The antireflection layer may be a transparent film formed, for example, vacuum-depositing magnesium fluoride to control a visible ray to a quarter wavelength, a multi-layer element of layers made of a substance having a high refractive index and those made of a substance having a low refractive index such as a multilayer element in which titanium oxide layers and silicon oxide layers are alternately placed one over another, and a layer obtained by coating a substance having a low refractive index such as a silicone resin and a fluorocarbon resin. Such an antireflection layer may be formed by direct deposition or coating on one surface of the transparent protection sheet or by adhering a transparent film having an antireflection layer formed to the transparent protection plate.

A method for producing the liquid crystal display device of the present invention includes a step of placing the nontacky silicone sheet having rubber elasticity on the liquid crystal display panel, and a step of removing air present at the interfaces of the liquid crystal display panel and the silicone sheet by placing the silicone sheet. In the case that dust or the like is attached to the outer surface of the silicone sheet, it is preferable to further include a step of removing foreign matters on the outer surface of the silicone sheet using an adhesive substance.

The liquid crystal display device of the present invention is specifically assembled as follows.

Figure 2:
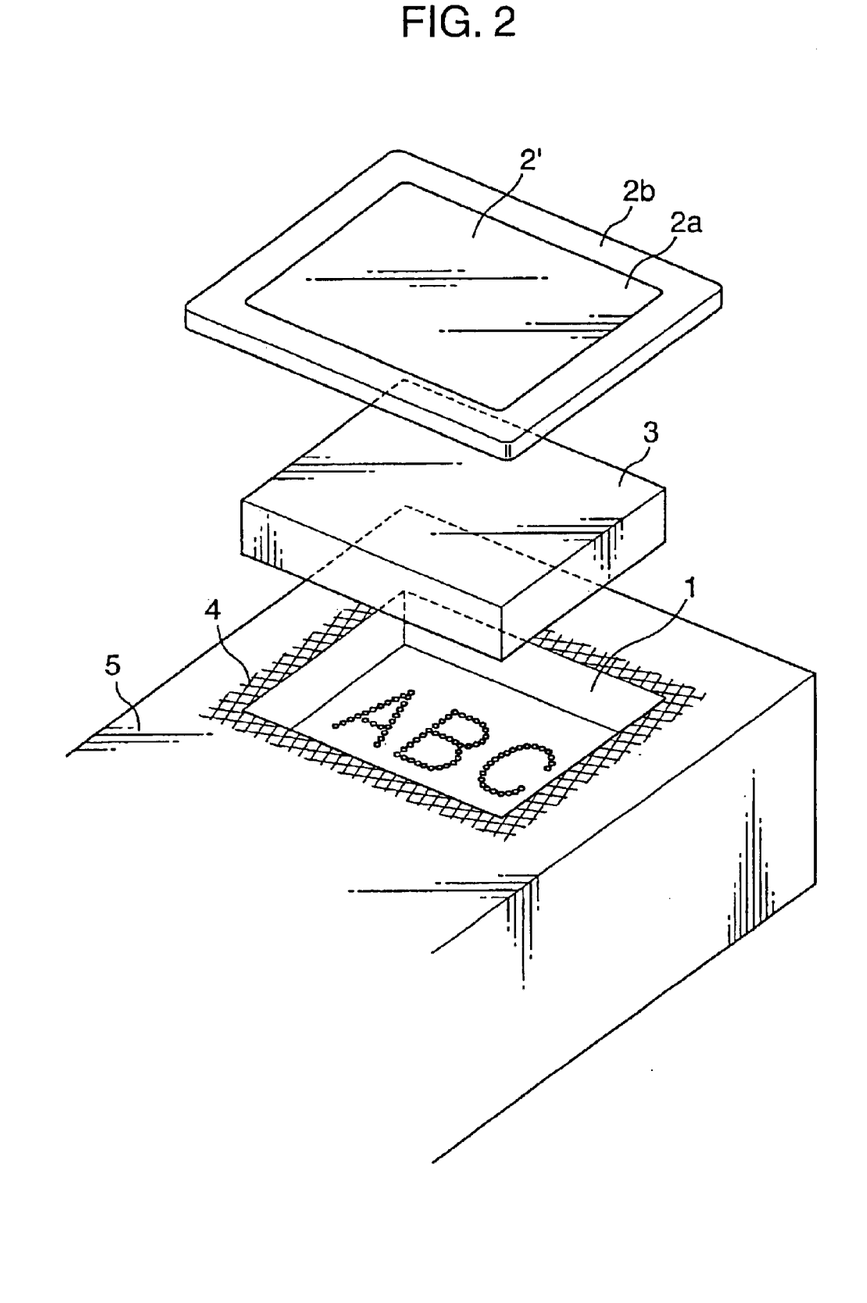
FIG. 2 is a diagram showing assembling of a liquid crystal display device according to one embodiment of the invention.

For example, as shown in FIG. 2, the silicone sheet 3 is placed on a portion of a device main body 5 where the liquid crystal display panel 1 is mounted. The silicone sheet 3 is adhered to the liquid crystal display panel 1 and air bubbles present at both interfaces are naturally removed due to the properties of the silicone sheet 3. Coupled with the elasticity of the silicone sheet 3, deaeration is promoted by hand-pressing when the silicone sheet 3 is placed. If air bubbles are present, deaeration is also possible by lifting an end portion of the silicone sheet 3 and then placing the silicone sheet 3 again on the liquid crystal display panel 1.

Next, a transparent protection plate 2' is placed on the silicone sheet 3. The transparent protection plate 2' is comprised of a transparent sheet portion 2'a having substantially the same size as the liquid crystal display panel 1 and an adhesive portion 2'b around the sheet portion 2'a. The transparent protection plate 2' is placed such that the transparent sheet portion 2'a overlaps the silicone sheet 3 and the adhesive portion 2'b overlaps an adhesive portion 4 provided around the liquid crystal display panel of the device main body 5. Here, adhesive may be applied either to the adhesive portion 4 of the device main body 5 or to the adhesive portion 2'b of the transparent protection plate 2'.

The transparent protection plate 2' is adhered to the silicone sheet 3 due to the properties of the silicone sheet 3 and air and air bubbles trapped at both interfaces are let out through an end portion only by hand-pressing.

Figure 3:
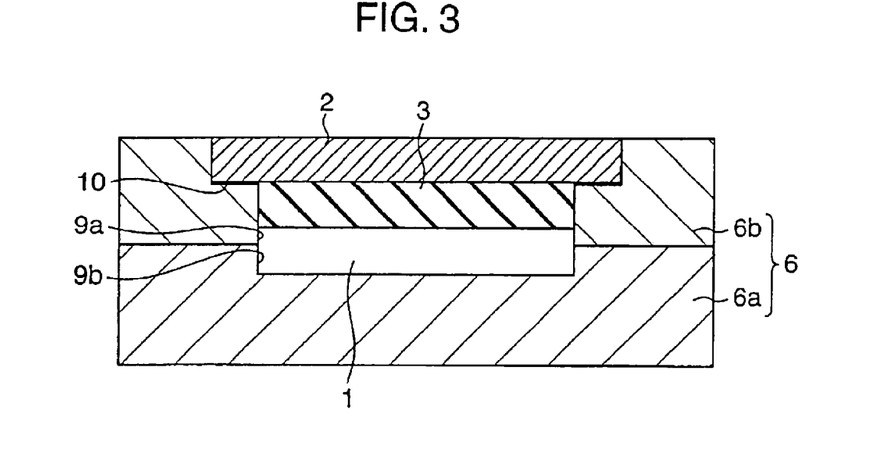
FIG. 3 is a diagram showing assembling of a liquid crystal display device according to another embodiment of the invention.

The adhesive is used to fix the transparent protection plate 2' in a mode shown in FIG. 2. However, as shown in FIG. 3, a combination of a first casing 6a having a holding portion 9a for the liquid crystal display panel 1 recessed and a second casing 6b having a holding portion 9b and a supporting portion 10 recessed, the supporting portion 10 being slightly larger than the holding portion 9b, may be used as a device main body 6, and the silicone sheet 3 may be mounted with an end portion of the transparent protection plate 2 supported by the supporting portion 10. In such a case, the transparent protection plate 2 can be fixed due to the adhesion of the silicone sheet 3 and the transparent protection plate 2 by providing the supporting portion 10 such that an end surface thereof is in flush with the end surface of the silicone sheet 3. However, it is not excluded to apply a tackiness agent or an adhesive tape to a portion of the supporting portion 10 where the transparent protection plate 2 is to be placed.

In the above assembling operation, if dust or the like is attached to the outer surface of the silicone sheet, it may be removed from the outer surface of the silicone sheet using an adhesive substance before the liquid crystal display panel is placed and before the transparent protection plate is placed after the liquid crystal display panel is placed. An adhesive tape, an adhesive roller, etc. can be used as the adhesive substance.

Further, the silicone sheet integrally formed on one surface of the transparent protection plate beforehand may be placed on the liquid crystal display panel. Specifically, after being cast or coated onto the transparent protection plate, a silicone composition for sheet is heated and cured to thereby form a sheet unit in which the transparent protection plate and the silicone sheet (transparent protection plate-sheet unit) are integrally bound and this unit is placed on the liquid crystal display panel such that the sheet unit and the liquid crystal display panel are adhered to each other. In such a case, deaeration is carried out only to remove air between the liquid crystal display panel and the transparent protection plate-sheet unit.

Figure 4:
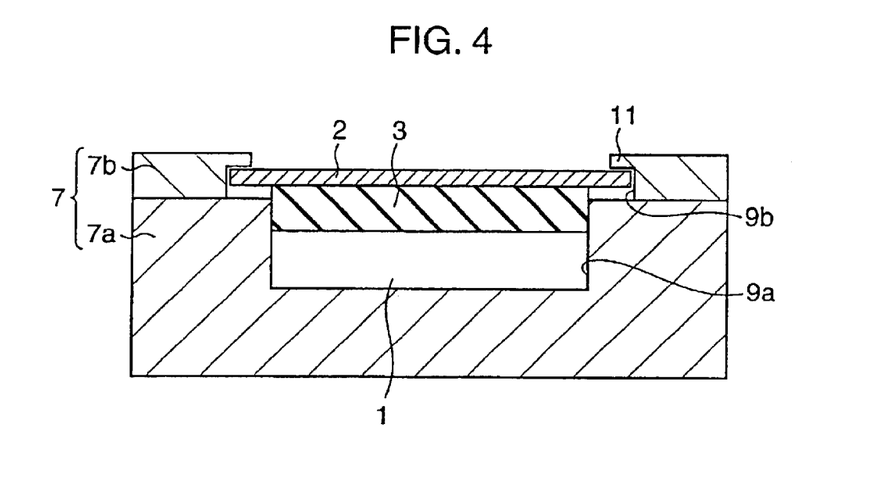
FIG. 4 is a diagram showing assembling of a liquid crystal display device according to still another embodiment of the invention.

Further, as shown in FIG. 4, a device main body 7 comprised of a first casing 7a having a holding portion 9a for the liquid crystal display panel 1 recessed and a second casing 7b having a holding portion 9b for the silicone sheet 3 recessed and a jaw 11 formed at an upper peripheral edge of the holding portion 9b may be used, whereby the transparent protection plate 2 is fixed in the holding portion 9b by the jaw 11. In this case as well, since the contact interfaces of the transparent protection plate 2 and the silicone sheet 3 can be adhered to each other due to the properties of the silicone sheet 3, the entire transparent protection plate 2 can be fixed by fixing an end portion of the transparent protection plate 2 by means of the jaw 11. However, it is not excluded to apply a tackiness agent or an adhesive sheet to a contact surface of the jaw 11 with the silicone sheet 3 to adhere the jaw 11 to the silicone sheet 3.

As described above, since the nonadhesive silicone sheet having rubber elasticity is used and adhered to the liquid crystal display panel and the transparent protection plate by the physical affinity in the liquid crystal display device of the present invention, it is not necessary to use a tackiness agent or an adhesive during assembling. Further, air entered between the silicone sheet and the liquid crystal display panel or the transparent protection plate can be removed only by hand-pressing without reducing the pressure or using a volatile liquid. By setting the JIS-A hardness of the silicone sheet at 2 or larger and the residual elongation distortion rate preferably substantially at 0%, the sheet can be made unlikely to be deformed or scratched during assembling, thereby preventing production of defective products. Further, dust or the like is unlikely to attach to the nontacky silicone sheet at the operation site and, even if it is attached, the stained surface can be easily cleaned by an adhesive tape, etc. Thus, a defect rate can be remarkably reduced while increasing a yield.

Furthermore, by using the transparent protection plate having an antireflection layer formed thereon, visibility can be higher than that obtained in a case where three antireflection layers are combined, which case having been conventionally regarded to provide the best visibility.

EXAMPLES

Relationship Between Tackiness and Transmittance

Using KE1935 produced by Shin-Etus Chemical Co. Ltd. or CY52–276, SE1821 or SH780U produced by Toray Dow Coning Silicone K.K. as a silicone compound, sheets (thickness: 2 mm) No. 1 to 11 having various hardnesses as shown in TABLE-1 were fabricated by changing an added amount of a curing agent (methyl hydrogen silicone oil) or a plasticizer (dimethyl silicone oil).

Viscosity, hardness, Young's modulus, and residual elongation distortion rate of the fabricated silicone sheets were measured according to the following methods, and a foreign matter removal test was conducted. Measurement results are shown in TABLE-1.

(1) Hardness

Since the sheets No. 1 to 3 are too soft and the hardness thereof could not be measured by a spring hardness meter, penetration depth (mm) of a needle was measured at a load of 1.34 g+8.03 g using a test machine ¼ cone needle according to a consistency testing method. The larger the penetration depth, the softer the sheet.

JIS-A hardness was measured using a JIS spring testing machine type A for the sheets No. 4 to 11.

(2) Tackiness

① Tackiness was measured in accordance with the "inclination ball tack" (JIS-Z237). Specifically, a test piece was adhered to a plate inclined by 30° and balls were caused to roll on the outer surface of the test piece. A maximum ball number is found among such balls that stop within a measurement area. The larger the ball number, the higher the tackiness.

② Loop Tack Test

Tackiness was measured in accordance with the loop tack test (JIS-Z237) using a strograph produced by K. K. Toyo Seiki Seisakusho. Specifically, a loop having a tacky surface faced out was made using a test piece having a thickness of 2 mm and a length of about 280 mm and hanged in a testing machine. After the tacky surface of the test piece was brought into contact with an area (25 mm×50 mm) of a testing plate, a force required to peel the test piece off the testing plate at a speed of 300±30 mm/min. was immediately measured.

Since it was difficult to fabricate the silicone sheet No. 1 such that it can be singly carried around, a silicone composition was applied onto an ethylene tetrafluoride resin tape (Naflon tape TOMBO9001) produced by Nichias Corp. and the peeling test was conducted using this. On the other hand, the silicone sheets No. 4 to 11 are immeasurable since no measurement value could be essentially obtained therefor.

(3) Young's Modulus (dyn/cm$^2$)

A relationship between elongation and a pulling force when the sheet was pulled was measured. However, for the silicone sheet No. 1, a relationship between a pressing force and a contraction amount when the sheet was pressed was obtained.

(4) Residual Elongation Distortion Rate (%)

Strip-shaped test pieces of 100 mm (length)×5 mm (width) ×2 mm (thickness) having the same compositions as the silicone sheets No. 1 to 11 were made and bench marks spaced apart by 20 mm were drawn in the center of each test piece. Subsequently, the opposite ends of each test piece was held by jigs and were pulled until the spacing between the bench marks becomes 30 mm (elongation of 150%).

Thereafter, the opposite ends were released from the pulling force and the test piece was left for 5 min. A rate of elongation of the spacing between the bench marks (rate of change of length) was calculated in accordance with equation below and obtained as a residual elongation distortion rate.

$$\text{Elongation distortion rate } (\%) = (\text{length of test piece after test} - 20 \text{ mm})/20 \text{ mm} \times 100$$

Upon measurement, for the sheets No. 1 to 3, in order to prevent restoration from being suppressed by the sheets being adhered to a mount due to their own tackiness, they were left on a vinyl sheet of 0.01 mm after elongation, so that they can contract with the vinyl sheet.

(5) Foreign Matter Removing Test

Initial transmittances of the silicone sheets No. 1 to 11 were measured. Subsequently, 0.1 g of talc PP specified by the Japanese Pharmacopoeia and produced by Matsumura Sangyo K. K. was uniformly crushed on the entire outer surfaces of the respective sheets using a comb. After the talc left unattached was lightly shaken off without touching the outer surfaces, transmittance (after crushing) was measured.

Subsequently, a tacky surface of a cellophane tape (product name: Cellotape) produced by Nichiban K. K. was adhered to the surface of the sheet having the crushed talc and the powder on the surface was removed by peeling the tape off. The tape adhering and peeling operation was repeated until no powder was attached to the tape. After the removal of the powder, transmittance was measured. It should be noted that light transmittance was measured using a UV/VIS (ultraviolet/visible ray) spectrophotometer of MODEL U-550 produced by Nippon Bunko K. K.

The above measurement results (transmittances) are shown in TABLE-1.

In TABLE-1, the amount of the curing agent to be added to the silicone composition is indicates by the mass % of the curing agent with respect to CY52–276.

TABLE-1

| No. | Silicone Composition | Hardness | Ball No. | Transmittance (%) | | | Loop tack Test (N/10 mm) | Elongation distortion rate (%) | Young's Modulus (dyn/cm$^2$) |
| | | | | Before Crushing | After Crushing | After Removal | | | |
|---|---|---|---|---|---|---|---|---|---|
| 1 | CY52-276 | PD 80 | 15 | 92.82 | 49.47 | 73.47 | 6.60 | 60 | $2 \times 10^5$ |
| 2 | CY52-276+CA 0.1 | PD 30 | 10 | 94.18 | 55.72 | 74.35 | 3.61 | 30 | $5 \times 10^5$ |
| 3 | CY52-276+CA 0.2 | PD 10 JISA 0 | 5 | 93.22 | 53.41 | 76.28 | 1.47 | 0 | $8 \times 10^5$ |
| 4 | CY52-276+CA 0.5 | JISA 2 | 2 | 94.14 | 59.23 | 94.54 | immeasurable | 0 | $4 \times 10^6$ |
| 5 | CY52-276+CA 0.7 | JISA 5 | 1 | 94.49 | 54.85 | 94.54 | immeasurable | 0 | $5 \times 10^6$ |
| 6 | CY52-276+CA 0.8 | JISA 10 | 1 | 94.23 | 58.25 | 94.33 | immeasurable | 0 | $6 \times 10^6$ |
| 7 | CY52-276+CA 1.0 | JISA 16 | 1 | 94.12 | 56.32 | 94.30 | immeasurable | 0 | $7 \times 10^6$ |
| 8 | SE1821 | JISA 20 | 1 | 94.11 | 55.15 | 94.60 | immeasurable | 0 | $8 \times 10^6$ |
| 9 | DE1935+CA | JISA 30 | 1 | 94.54 | 54.36 | 94.68 | immeasurable | 0 | $1 \times 10^7$ |
| 10 | DE1935 | JISA 50 | 1 | 94.12 | 55.62 | 94.31 | immeasurable | 0 | $5 \times 10^7$ |
| 11 | SH780U | JISA 80 | 1 | 91.55 | 58.33 | 91.68 | immeasurable | 20 | $9 \times 10^7$ |

CA: curing agent, PD: penetration depth

As can be seen from TABLE-1, since the sheets No. 1 to 3 were tacky, it was difficult to clean the surface by completely removing the powder after crushing and, accordingly, transmittance could be not recovered. On the other hand, if JIS-A hardness was 2 or higher, the ball number indicated in the ball tack test was 2 or lower and the powder could be completely removed to clean the surface after crushing and transmittance could also be recovered to a level equal to or higher than the one before crushing.

Since the elongation distortion rates of the sheets No. 1 and 2 are large, they are inconvenient to handle during the assembling operation and become defective and cannot be used again once being elongated. Despite its hardness, the sheet No. 11 could not be restored to its original shape once being elongated and scratch marks remained once being scratched by nail or the like, thereby permitting the entrance of air at the scratched portions to reduce adhesion.

[Relationship Between Surface Roughness and Adhesion]

Standard pieces having standard surface roughnesses in the JIS comparison table were prepared by face mill grinding, surface grinding or shaping, and compositions having different mixing ratios of a silicone compound (KE1300T produced by Shin-Etus Chemical Co. Ltd.) and a plasticizer (silicone oil) were cast and cured.

Silicone sheets obtained by curing were peeled off from the standard pieces, thereby obtaining silicone sheets each having a surface reflecting the surface roughness of the standard piece. The JIS-A hardness of each silicone sheet was measured.

Figure 5:
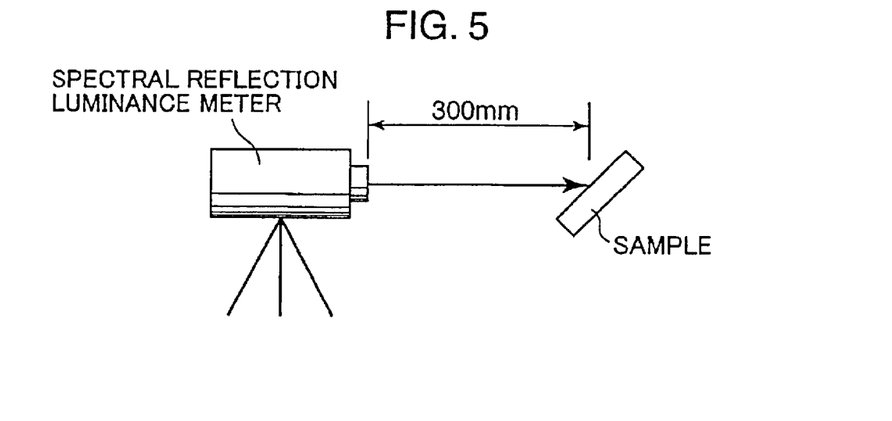
FIG. 5 is a diagram showing a method for measuring a light reflected by the liquid crystal display device, FIGS. 6(A) and (B) are graphs of spectra of reflected lights of the embodiment and a comparative example as measurement results.

Each of the above-fabricated silicone sheets having different surface roughnesses was placed on a glass plate such that the surface reflecting the surface roughness of the standard piece was in contact with the glass plate, and whether or not air has entered between the glass plate and the silicone sheet was visually confirmed. "○" denotes a case where the entrance of air could not confirmed, whereas "x" denotes a case where the entrance of air was confirmed. The result is shown in TABLE-2.

fluorescent portion which is a reflection of a black display portion of the liquid crystal display panel on the transparent protection plate and the black display portion of the liquid crystal display panel. Further, intensity of the reflected light was measured.

On the other hand, for comparison, surface reflectance and intensity of the reflected light were similarly measured for a game machine assembled without the silicone sheet, i.e. game machine in which an air layer of 3 mm is present between the liquid crystal display panel and the transparent protection plate (comparative example).

Figure 6A:
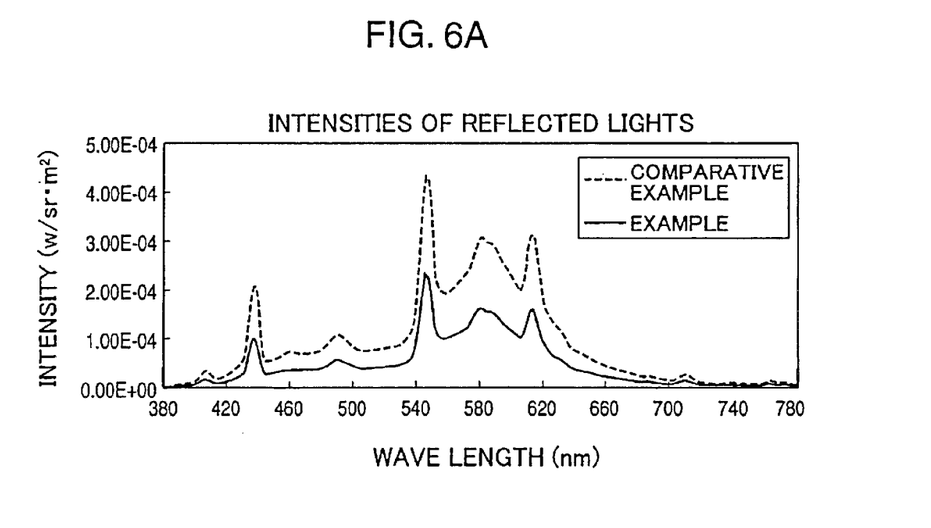
Figure 6B:
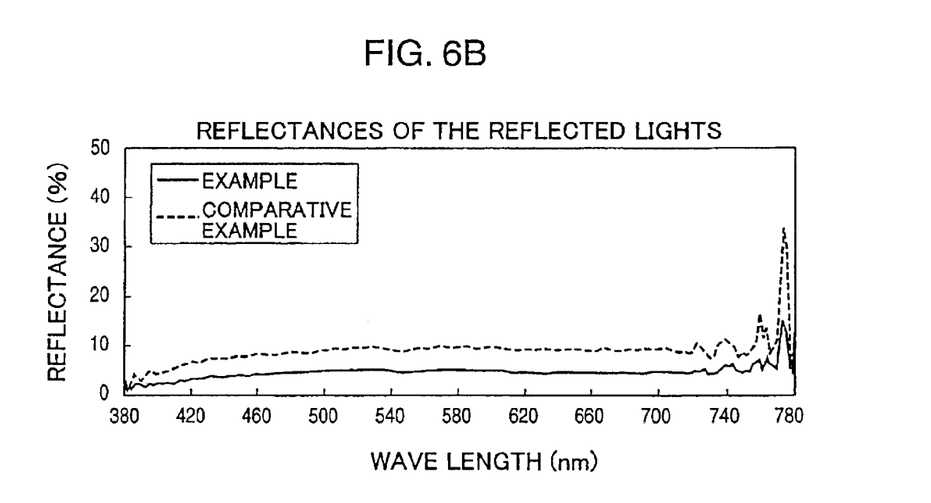

The result is shown in FIG. 6. FIG. 6A shows intensities of the reflected lights at the respective wavelengths, and FIG. 6B shows reflectances of the reflected lights at the respective wavelengths.

As can be seen from FIG. 6, reflectance and intensity of the reflected light are lower in the example than in the comparative example, and the example is free from a reduction in visibility caused by the presence of the air layer.

Effect of Antireflection Layer

Units were assembled by combining, as shown in TABLE-3, a transparent protection plate (thickness: 1.0 mm) made of a polycarbonate and having an antireflection film (arc top produced by Asahi Glass Company, Ltd.) formed on one or both surfaces, a silicone sheet having a JIS-A hardness of 40 and a thickness of 3 mm, a transparent protection plate (thickness: 1.0 mm) made of a polycarbonate and having no antireflection film adhered thereto, and were set on glass plates. An air layer was 3.0 mm.

For the respective units, transmittance and reflectance were measured using an ultraviolet/visible ray spectropho-

TABLE-2

| Grinding Method | Face Mill Grinding | | | | | | Surface Grinding | | | | | | Keisaku | | |
|---|---|---|---|---|---|---|---|---|---|---|---|---|---|---|---|
| Finishing Mark | ▽▽▽ | | ▽▽ | | ▽ | | ▽▽▽▽ | ▽▽▽ | | | ▽▽ | | ▽▽▽ | ▽▽ | ▽ |
| Surface Ra (μm) | 1.6 | 3.2 | 6.3 | 12.5 | 25 | 50 | 0.8 | 1.6 | 3.2 | 6.3 | 12.5 | 25 | 6.3 | 12.5 | 25 | 50 |
| Hardness 5 | ○ | ○ | ○ | ○ | X | X | ○ | ○ | ○ | ○ | ○ | X | ○ | X | X | X |
| Hardness 20 | ○ | ○ | ○ | X | X | X | ○ | ○ | ○ | X | X | X | ○ | X | X | X |
| Hardness 40 | ○ | ○ | ○ | X | X | X | ○ | ○ | ○ | X | X | X | ○ | X | X | X |

As can be seen from TABLE-2, whether air enters or not differs depending on the surface grinding method even if surface roughness is same. However, if surface roughness is 5 μm or lower, the sheet can be adhered to the glass plate without allowing any entrance of air regardless of hardness. On the other hand, if surface roughness exceeds 12.5 μm, the sheet cannot be adhered since air enters regardless of the hardness of the sheet.

In the case of the soft sheets having a JIS-A hardness of about 5, they could be adhered to the glass plate without any entrance of air if surface roughness is within a range of 5 to 12.5 μm.

Presence of Silicone Sheet

Figure 7:
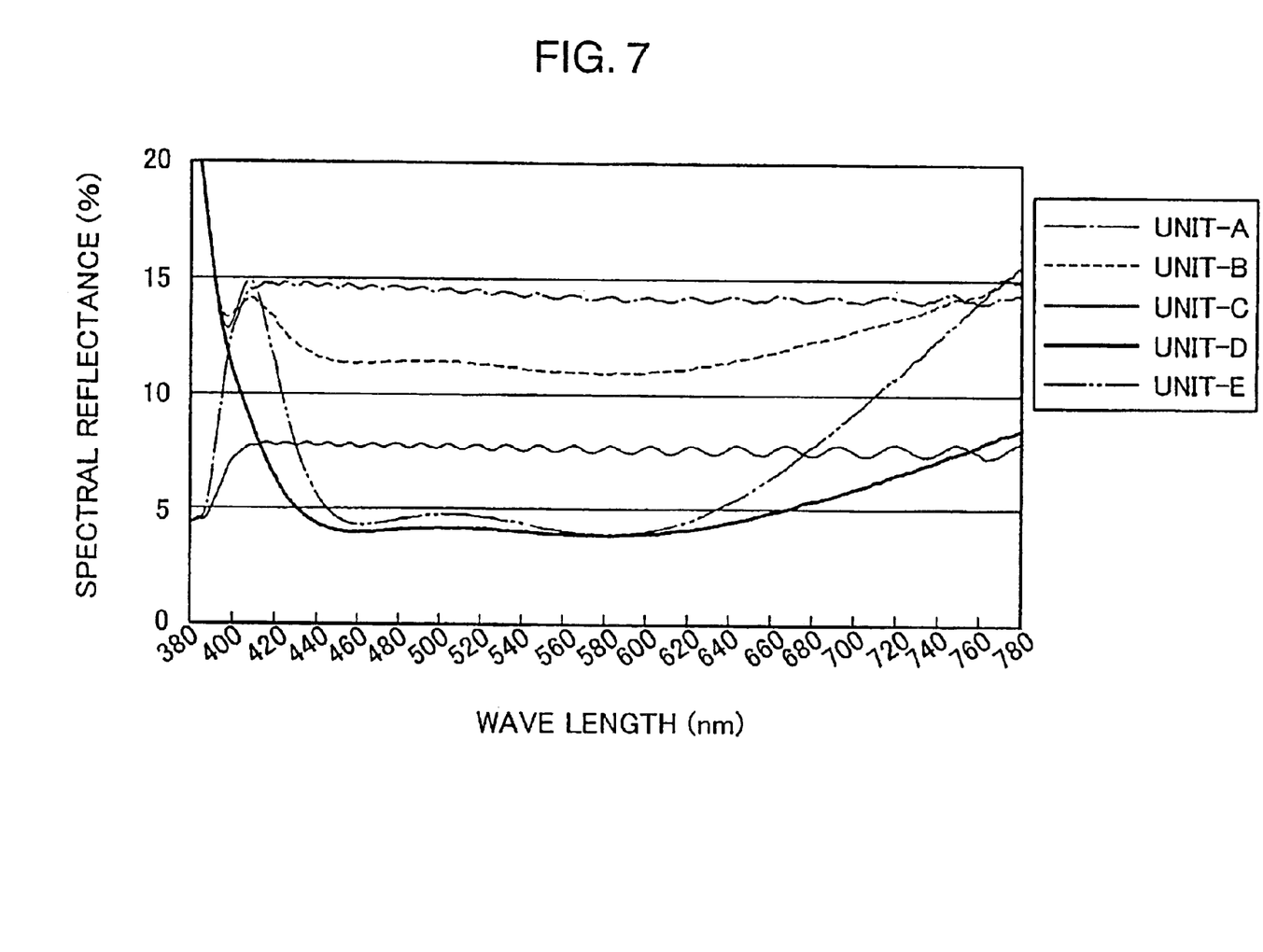
FIG. 7 is a graph of spectra showing reflectances of units A to E.
Figure 8:
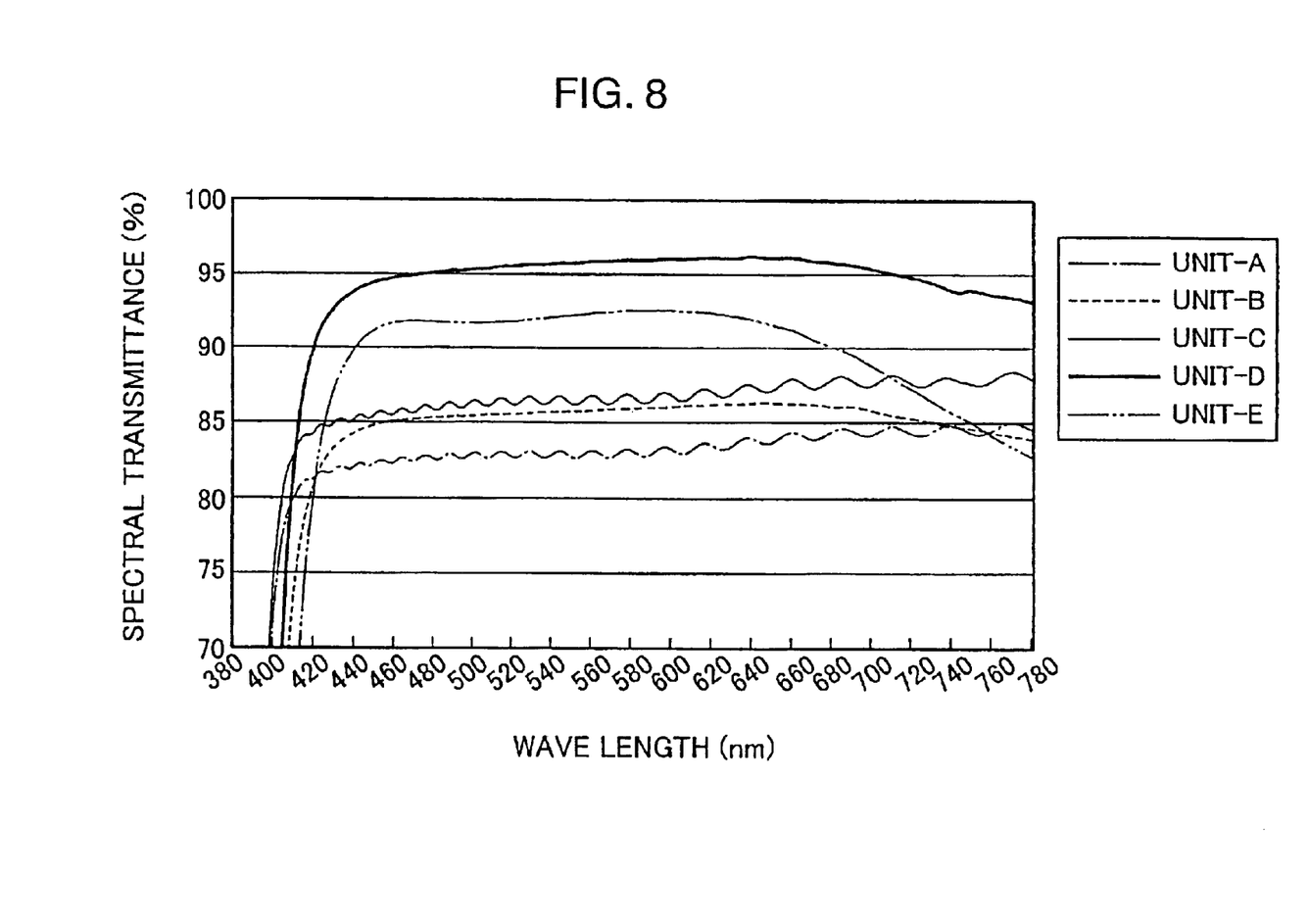
FIG. 8 is a graph showing spectra showing transmittances of the units A to E.

A silicone sheet (JIS-A hardness: 40) having a thickness of 3 mm fabricated by curing CY52–205 produced by Toray Dow Coning Silicone K. K. and a polycarbonate plate as a transparent protection plate were assembled in a mode shown in FIG. 2 on a portable game machine in which a reflection type TFT color liquid crystal display panel was mounted (Example). The assembled transparent display device was fixed at a point distanced 300 mm from a spectral reflection luminance meter (PR-704 produced by Photo Research) while being inclined by 45° as shown in FIG. 5, and surface reflectance was measured at two positions: a tometer of MODEL U-550 produced by Nippon Bunko K. K. Measurement results are shown in TABLE-3 and FIGS. 7 and 8. In TABLE-3, "resin layer" means the transparent protection plate, "transparent sheet" means the silicone sheet and "AR layer" means the antireflection film.

TABLE 3

| Unit | Construction | Transmittance (%) | Reflectance (%) |
|---|---|---|---|
| A | Resin Plate-Air Layer-Glass Plate | 82.97 | 14.31 |
| B | AR Layer-Resin Plate-Air Layer-Glass Plate | 85.76 | 11.17 |
| C | Resin Plate-Transparent Sheet-Glass Plate | 86.51 | 7.64 |
| D | AR Layer-Resin Plate-Transparent Sheet-Glass Plate | 95.75 | 4.01 |
| E | AR Layer-Resin Plate-AR Layer-Air Layer-AR Layer-Glass Plate | 92.12 | 4.33 |

In the case of the unit B where one antireflection layer was provided, transmittance and reflectance were lower than the unit C in which the silicone sheet is provided to eliminate the air layer.

However, in the case of the unit E where three antireflection films are formed, transmittance and reflectance were higher than the unit C.

In the unit D, the silicone sheet was provided to eliminate the air layer between the glass plate and the transparent protection plate and the antireflection film was adhered to the surface of the transparent protection plate at the side of an air interface. In this case, transmittance was higher and reflectance was lower than the unit E where three antireflection films were formed, and it can be understand that a best visibility was displayed.

This application is based on Japanese Application Serial No. 2000-389444 filed in Japanese Patent Office on Dec. 21, 2000, the contents of which are hereby incorporated by reference.

While only certain preferred embodiments of the present invention have been described in detail, as will be apparent for those skilled in the art, certain changes and modifications may be made in embodiments without departing from the spirit and scope of the present invention as defined by the following claims.

What is claimed is:

1. A liquid crystal display device, comprising:
    a liquid crystal display panel,
    a nontacky silicone sheet having rubber elasticity and placed on and adhered to the liquid crystal display panel, and
    a transparent protection plate placed on and adhered to the silicone sheet,
    wherein a rate of change of length is substantially 0% when a sheet piece made of the silicone sheet and having a length of 100 mm, a width of 5 mm and a thickness of 2 mm is elongated in longitudinal direction by 150% for 5 minutes and then a pulling force is released.

2. A liquid crystal display device according to claim 1, wherein the silicone sheet has a surface roughness (Ra) of 5 µm or lower.

3. A liquid crystal display device according to claim 1, wherein the silicone sheet has a ball number of 2 or lower, which is measured in a ball tack test in accordance with JIS Z0237.

4. A liquid crystal display device according to claim 1, wherein the silicone sheet has a JIS-A hardness of 2 to 70.

5. A liquid crystal display device according to claim 1, wherein the silicone sheet has Young's modulus of $1 \times 10^6$ dyn/cm$^2$ to $8 \times 10^7$ dyn/cm$^2$.

6. A liquid crystal display device according to claim 1, wherein the silicone sheet includes a sheet-shaped silicone gel body and a silicone coating layer coating the silicone gel body, and the silicone coating layer is a nontacky layer having a higher degree of crosslinking than the silicone gel.

7. A liquid crystal display device according to claim 6, wherein the outer surface of the nontacky layer has a ball number of 2 or lower, which is measured in a ball tack test in accordance with JIS Z0237.

8. A liquid crystal display device according to claim 1, wherein an antireflection layer is formed on the surface of the transparent protection plate on which surface the silicone sheet is not placed.

9. A liquid crystal display device, comprising:
    a liquid crystal display panel,
    a silicone sheet placed on and adhered to the liquid crystal display panel and having a JIS-A hardness of 2 to 70, a surface roughness (Ra) of 5 µm or lower, a ball number of 2 or lower, which is measured in a ball tack test in accordance with JIS Z0237, and Young's modulus of $1 \times 10^6$ dyn/cm$^2$ to $8 \times 10^7$ dyn/cm$^2$,
    wherein a rate of change of length is substantially 0% when a sheet piece made of the silicone sheet and having a length of 100 mm, a width of 5 mm and a thickness of 2 mm is elongated in longitudinal direction by 150% for 5 minutes and then a pulling force is released, and
    a transparent protection plate placed on and adhered to the silicone sheet.

10. A liquid crystal display device according to claim 9, wherein an antireflection layer is formed on the surface of the transparent protection plate on which surface the silicone sheet is not placed.

11. A liquid crystal display device according to claim 1, wherein the transparent protection plate includes two transparent plates and a transparent electrode held between the transparent plates.

12. A liquid crystal display device according to claim 8, wherein the transparent protection plate includes two transparent plates and a transparent electrode held between the transparent plates.

13. A liquid crystal display device according to claim 9, wherein the transparent protection plate includes two transparent plates and a transparent electrode held between the transparent plates.

14. A liquid crystal display device according to claim 10, wherein the transparent protection plate includes two transparent plates and a transparent electrode held between the transparent plates.

15. A method for producing a liquid crystal display device, comprising the steps of:
    placing a nontacky silicone sheet having rubber elasticity on a liquid crystal display panel, and
    removing air present at interfaces of the liquid crystal display panel and the silicone sheet by placing the silicone sheet, and
    using the nontacky silicone sheet of which rate of change of length is substantially 0% when a sheet piece made of the silicone sheet and having a length of 100 mm, a width of 5 mm and a thickness of 2 mm is elongated in longitudinal direction by 150% for 5 minutes and then a pulling force is released.

16. The method for producing a liquid crystal display device according to claim 15, further comprising the step of removing foreign matters on the outer surfaces of the silicone sheet using an adhesive substance.

* * * * *